United States Patent
Hester et al.

(10) Patent No.: US 11,474,233 B2
(45) Date of Patent: Oct. 18, 2022

(54) SYSTEM FOR SENSING BACKSCATTER TAG COMMUNICATIONS FROM RETRODIRECTIVE ANTENNA ARRAYS

(71) Applicant: GEORGIA TECH RESEARCH CORPORATION, Atlanta, GA (US)

(72) Inventors: Jimmy Georges Donald Hester, Atlanta, GA (US); Emmanouil M Tentzeris, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 82 days.

(21) Appl. No.: 16/956,587

(22) PCT Filed: Dec. 21, 2018

(86) PCT No.: PCT/US2018/067043
§ 371 (c)(1),
(2) Date: Jun. 20, 2020

(87) PCT Pub. No.: WO2019/226202
PCT Pub. Date: Nov. 28, 2019

(65) Prior Publication Data
US 2021/0165092 A1    Jun. 3, 2021

Related U.S. Application Data

(60) Provisional application No. 62/608,764, filed on Dec. 21, 2017.

(51) Int. Cl.
*G01S 13/75* (2006.01)
*G01S 7/02* (2006.01)
(Continued)

(52) U.S. Cl.
CPC ............ *G01S 13/758* (2013.01); *G01S 7/025* (2013.01); *G01S 13/825* (2013.01); *G06K 7/10168* (2013.01); *H01Q 3/2647* (2013.01)

(58) Field of Classification Search
CPC ....... G01S 13/758; G01S 13/825; G01S 7/025
(Continued)

(56) References Cited

U.S. PATENT DOCUMENTS

2007/0126585 A1* 6/2007 Okunev ............ G06K 7/10356
340/572.2
2010/0001846 A1* 1/2010 Cardullo .......... G06K 19/07786
340/10.4
(Continued)

FOREIGN PATENT DOCUMENTS

WO   WO 2011/163279 A2   12/2011
WO   WO 2017/136242 A1    8/2017

OTHER PUBLICATIONS

Written Opinion of the International Searching Authority re PCT/US2018/67043 dated Nov. 12, 2019.
(Continued)

*Primary Examiner* — Bo Fan
(74) *Attorney, Agent, or Firm* — Foley & Lardner LLP (57) ABSTRACT

A system for using thin and energy-autonomous backscatter tags and corresponding sensing nodes may operate with 24 GHz backscatter reflectarray tags having low power consumption. A digital beam steering, frequency-modulated continuous wave (FMCW) radar may be used for detection, localization, identification and communications. The tags may include environmental sensors that are used to modulate backscatter waves for data communications directed to a reader or may digitally modulate the backscatter transmissions without sensor data for independent localization of each tag in a network.

23 Claims, 9 Drawing Sheets

(51) Int. Cl.
  *G01S 13/82* (2006.01)
  *G06K 7/10* (2006.01)
  *H01Q 3/26* (2006.01)

(58) Field of Classification Search
  USPC .......... 342/51, 357.59, 130, 42, 52, 59, 113
  See application file for complete search history.

(56) References Cited

U.S. PATENT DOCUMENTS

| | | | | |
|---|---|---|---|---|
| 2012/0139704 | A1* | 6/2012 | Sadr | ........................ G01S 5/12 |
| | | | | 340/8.1 |
| 2014/0020471 | A1* | 1/2014 | Ivanov | .................. G01L 9/0005 |
| | | | | 73/725 |
| 2017/0286820 | A1* | 10/2017 | Nikunen | ............ G06K 19/0723 |

OTHER PUBLICATIONS

Hong et al. 24GHz active retrodirective antenna array in: IEEE Electronics Letters, vol. 25, Isseu 21, Oct. 14, 1999, p. 1785-17856.

\* cited by examiner

SYSTEM FOR SENSING BACKSCATTER TAG COMMUNICATIONS FROM RETRODIRECTIVE ANTENNA ARRAYS

CROSS REFERENCE TO RELATED APPLICATIONS

This application claims the benefit of U.S. Provisional Patent Application Ser. No. 62/608,764 filed on Dec. 21, 2017, entitled "MIMO FMCW Radar with Semi-Passive Backscatter Targets for Combined Localization and Communication," which is incorporated in its entirety by reference as if set forth fully herein.

STATEMENT REGARDING FEDERALLY SPONSORED RESEARCH

This invention was made with government support under Defense Threat Reduction Agency (DTRA) Contract No. HDTRA1-14-1-0001 awarded by the Department of Defense. The government has certain rights in the invention.

FIELD

This disclosure relates to the field of backscatter tags having retrodirective antenna arrays that reflect an incident wave transmitted from a corresponding reader.

BACKGROUND

The Internet of Things (IoT) has for the last few years promised to provide break-through applications through the ubiquitous implementation of low-power long-battery-life, wirelessly-enabled sensing and actuating devices. Nevertheless, today's wireless transceiver technologies such as Bluetooth® Low Energy (BLE) and long-range wireless (LoRa) communications require on the on order of 10 mW to 200 mW of power during transmission to provide communications. These IoT devices, therefore, require the use of batteries and aggressive duty-cycling in order to provide several years of maintenance-free operation. Furthermore, these prior devices exclusively operate in the 900 MHz and 2.4 GHz ISM bands. As a consequence, the minimum thickness of the substrate that the devices are built on (dictated by the need for an ability to operate while set onto metal surfaces) can only be made as thin as on the order of a few millimeters.

Alternative technologies such as Radio Frequency Identification (RFID) systems, using ultra-low-power backscatter communications schemes, provide a solution to the high-power consumption of active transceivers, but achieve it at the cost of shorter ranges and/or difficulties in multiplexing encountered due to the lack of receivers positioned on these low-power tags. Previous efforts have demonstrated the use of high-frequency (mm-wave) reflectarray approaches to provide, both in chip-less and semi-passive manners, certain long-range communications capabilities with ultra-slim and flexible sensors/tags for the IoT [1], [2]. However, the multiplexing problem has remained. In parallel, recent efforts have reported the use of the combination of frequency modulated continuous wave (FMCW) schemes and tags that are active, backscatter modulating, and amplifying. These features are useful ad targets for localization purposes [3], [4], which can be utilized to enable high-density implementations of dense and spatially-multiplexed tags. Nevertheless, the reported targets/tags have remained extremely bulky (several cm in thickness) and power consuming (100 s of milliwatts). The readers were also large and costly.

SUMMARY

In a first embodiment, a system of detecting backscatter wave emissions from a set of data sources includes a computerized reader in communication with a computer processor and memory with the reader including a transmitter and a receiver. A plurality of tag devices are configured to communicate with the reader and have at least one sensor assembly configured to gather data. A timer circuit is connected to the sensor assembly and configured to generate an output having a frequency response corresponding to the sensor assembly. An array of antennas are each connected to the output of the timer circuit such that the output of the timer circuit modulates backscatter wave emissions from the array.

In a different embodiment, a tag device for use in a backscatter wave emission reading system includes a power circuit, at least one sensor assembly configured to gather data from an environment, and a timer circuit connected to the sensor assembly and configured to generate an output having a frequency response corresponding to the sensor assembly. An array of antennas is positioned to reflect an incident wave transmission having a resonant frequency in the Ku band, wherein each antenna is connected to the output of the timer circuit such that the output of the timer circuit modulates backscatter wave emissions from the array of antennas. The sensor assembly, the timer circuit, and the array of antennas are connected to the power circuit.

Another embodiment disclosed below includes a computerized method of retrieving backscatter emissions from a plurality of tag devices by positioning the plurality of tag devices within an interrogation range of a reader, the tag devices each having multiple reflecting antennas. Measuring an oscillation frequency of a sensor in at least one selected tag device establishes a first oscillation frequency measurement such that upon receiving an incident wave transmission at the selected tag device, the method frequency modulates the incident wave transmission with the oscillation frequency of the sensor to form a backscatter wave transmission from the selected tag device. A reader receives communications from the tag by reflecting the backscatter transmission at a modulated frequency from each of the antennas in the selected tag device, wherein the reflecting includes cross-polarizing the backscatter wave transmission relative to the incident wave transmission. Receiving backscatter wave transmission from each of the antennas at a respectively modulated frequency in a plurality of corresponding antennas in a reader device allows for demodulation by a computer to extract data communications from the backscatter emissions.

In yet another embodiment, a system of detecting backscatter wave emissions from a set of data sources includes a computerized reader in communication with a computer processor and memory, and the reader has a transmitter and a receiver. A plurality of tag devices is part of the system, and each tag device has a power circuit with an energy harvesting and storing device. A modulation circuit is connected to the sensor assembly and configured to generate an output having a frequency response that is unique for each respective one of the tag devices. An array of antennas includes each antenna connected to the output of the modulation circuit such that the output of the modulation circuit controls frequency modulation of backscatter wave emissions from the array. The array of antennas reflects an incident wave transmission from the reader back to the receiver as the backscatter wave emissions in a cross-polarized state.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

DETAILED DESCRIPTION

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Unless defined otherwise, all technical and scientific terms used herein have the same meaning as commonly understood to one of ordinary skill in the art to which this invention belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically incorporated by reference in their entireties and at least for the material for which they are cited.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

This disclosure reports the introduction of a holistic approach for the emergence of flexible, ultra-thin ultra-low-power, sensing-enabled and energy-autonomous sticker sensor/tags 100 for the IoT (IoT), leading to a suggestion of the "Internet of Skins (IoS)" given the flexible and thin structure for tags disclosed here. In a first section, the ultra-thin target/tag 100, 200 used in this work is described and its properties, structure and capabilities reported. In a second sense, the low-cost FMCW radar module 300 used for tag/sensor localization, identification and detection is introduced, along with its custom designed multi-channel antenna 310.

The disclosure materials included herein show the use of the combination of a frequency modulated continuous wave (FMCW) reader 300 approach and of flexible printed semi-passive targets/tags 100 for localization and data communications purposes. Data encoding is attained through tag backscatter emissions/radiation while range localization and instant velocity measurements are enabled using the measured properties of down-converted FMCW signal (beat frequencies and so forth 317) processed by the downconverter 345 of FIG. 3B. Finally, the reader 300 uses several antennas 310 in a multiple input multiple output (MIMO) scheme to determine angle of arrival. The angular and radial localization capabilities of the system are also used for spatial multiplexing in the case of dense tag implementations. The system enables the real time localization of and reception of data from compact micro-watt backscatter tags 100 for real time localization RTLS and ultra-low power Internet of Things (TOT) communications.

Figure 1A:
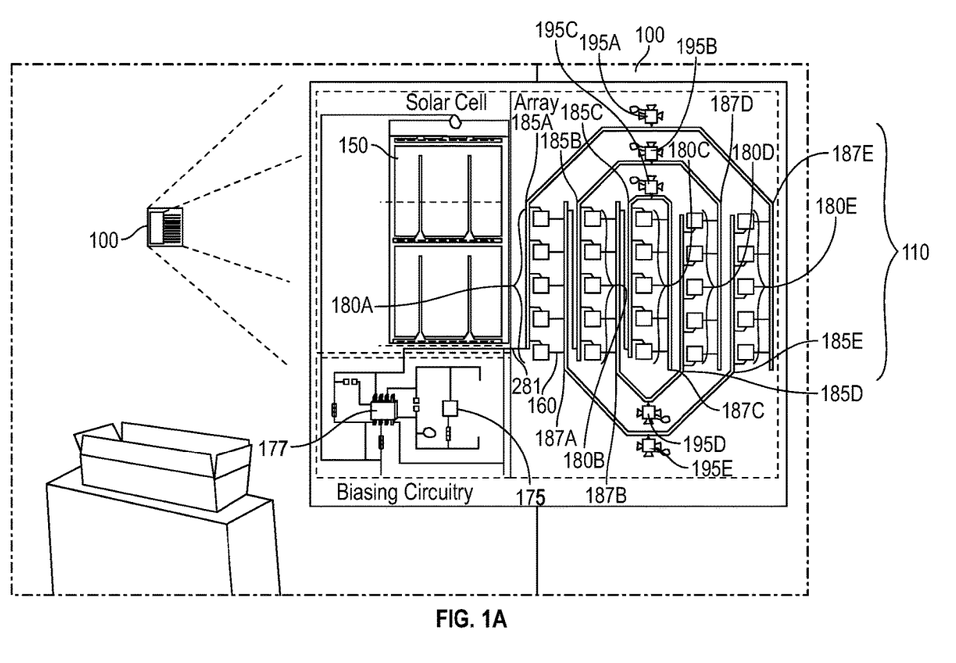
FIG. 1A is a schematic of an assembled ultra-low-profile and micro-watt semi-passive reflectarray sensing tag as disclosed herein.
Figure 1B:
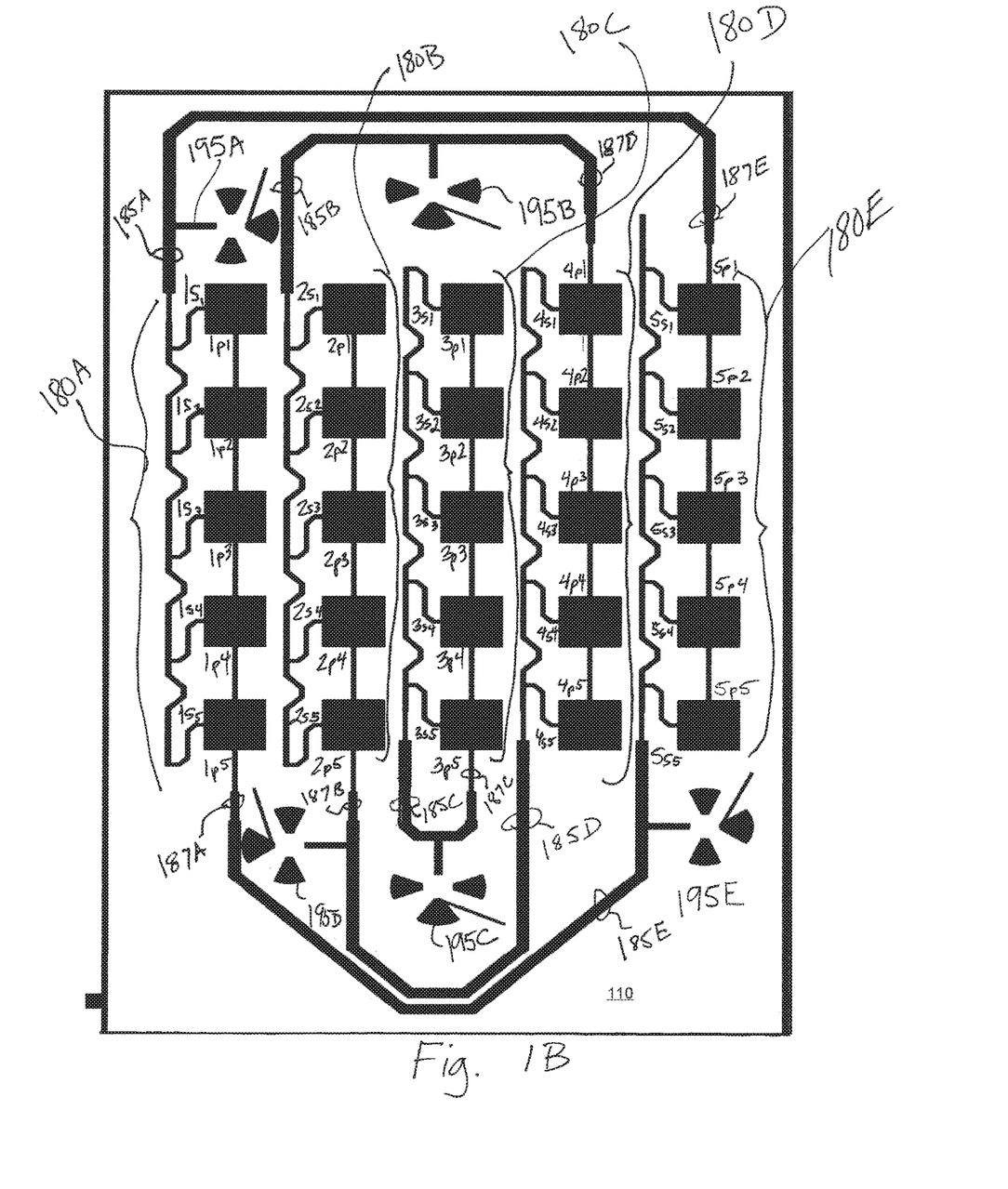
FIG. 1B is a schematic illustration of the reflectarray of FIG. 1A exhibiting cross polarization circuitry as disclosed herein.

The reported semi-passive tag 100, shown in FIG. 1 as one non-limiting example implementation, encompasses all elements required for real-time ubiquitous sensing applications into a thin, flexible skin-like package. An ultra-low-power 555 timer (LTC6906) 177, powered by a flexible amorphous silicon solar cell (MP3-25) 150 input into a 1.8 V LT3009 regulator, is connected to a carbon-nanotubes resistometric chemical-warfare-agent printed sensor 240 whose resistivity sets it oscillation frequency via an RC circuit output to a timer circuit 177. This part of the system is assembled onto a flexible 5-mil-thick polyimide circuit board. The output of the timer 177 is connected to a 24 GHz cross-polarizing retrodirective switchable patch-antenna array 110 fabricated onto a 12-mil-thick Rogers RO4003 substrate. Without limiting this disclosure to any one embodiment, each retrodirective antenna 160 in the antenna array 110 transmits an incident wave back in the direction from which the wave originated, typically back to a reader 300. In one non-limiting example, the antenna array 110 is a reflectarray built of 5 linear patch-antenna arrays 180A, 180B, 180C, 180D, 180E, (e.g., arranged in columns) with a hybrid serial/parallel cross-polarized feeding networks couple as shown in FIG. 1B discussed below. The configuration of the dual inter-antennas routing network creates coherent re-emission of the impinging wave in its direction of arrival, with an orthogonal polarization, thereby enabling higher TX-RX isolation of the reader channels 315.

Figure 4:
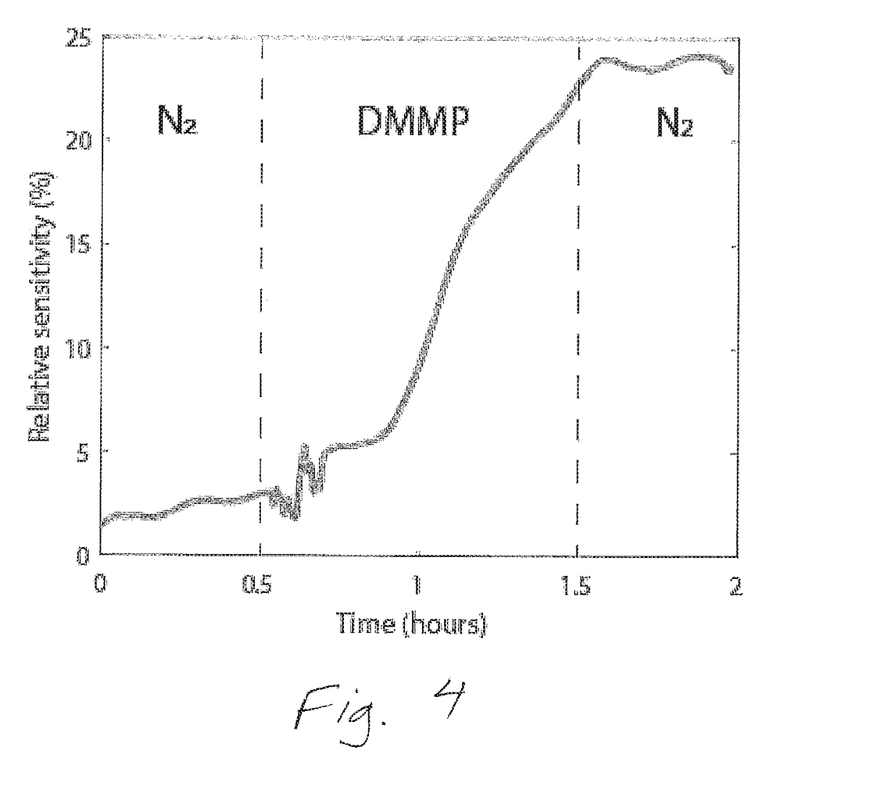
FIG. 4 is a schematic illustration of a relative response of a fully-printed CWA sensor to 2.5 ppm of DMMP, a low-toxicity organo-phosphonate CWA simulant.

In one non-limiting embodiment, the differential (difference between 'ON' and 'OFF' states of the switches) radar-cross-section (RCS) of the tag array 110 was measured in an anechoic chamber, and displays a peak value of −31 dBsm, with a variation of less than 10 dB over an angular range of −50 to 50, consistent with the retrodirective operation. In this tested embodiment, the antenna array 110 is connected to a carbon-nanotubes (CNT) chemical warfare agent (CWA) sensor 240 fabricated on a PET substrate by printing silver-nanoparticles-based (SNP-based) electrode leads, followed by 15 layers of purified semiconducting carbon nanotubes (CNTs), and by SNP-based electrodes fingers. Both substrates and carbon nanotube (CNT) films were exposed to a UV-O3 treatment to promote wettability of the inks and enhance adhesion. Finally, 50 µL of a hexa-fluoro-alcohol (HFA) were drop-casted onto the sensor 240 to functionalize it for specific CWA detection. The sensor 240 was tested in a controlled environment using a CWA simulant-dimethyl methylphosphonate (DMMP) and its relative sensitivity (relative change of its resistance) was recorded, as shown on FIG. 4. The sensor 240 displays extremely high sensitivity (24%) to only 2.5 ppm of DMMP vapor.

The ultra-low-profile semi-passive tag 100 can readily operate in an energy-autonomous fashion in indoor environments thanks to its ultra-low-power consumption of 19 µW (measured with a 3 V input on the regulator), a 10-fold improvement compared to earlier semi-passive Van-Atta backscatters [2], and a 4-order-of-magnitude decrease in power consumption relative to previously-reported FMCW backscatters [3], [4]. This low power requirement allows for the tag devices 100 described herein to carry an energy harvesting and storage device 150, 250 such as but not limited to a solar cell within the tag device architecture.

Figure 3A:
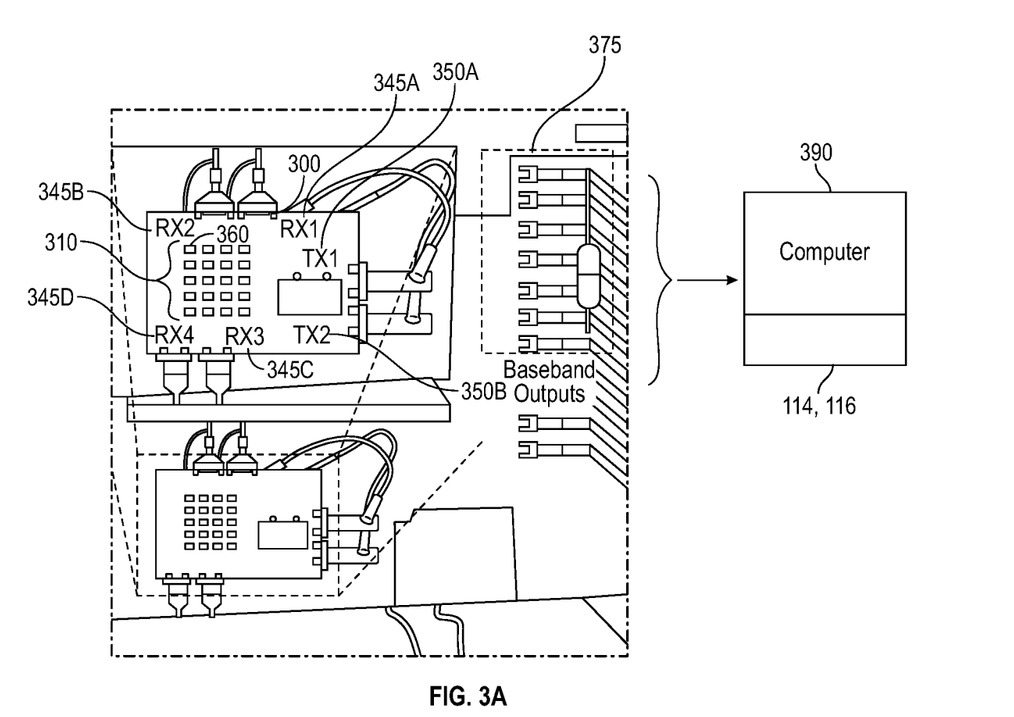
FIG. 3A is a schematic of a reader assembly receiving backscatter radiation from tag devices as disclosed herein.
Figure 3B:
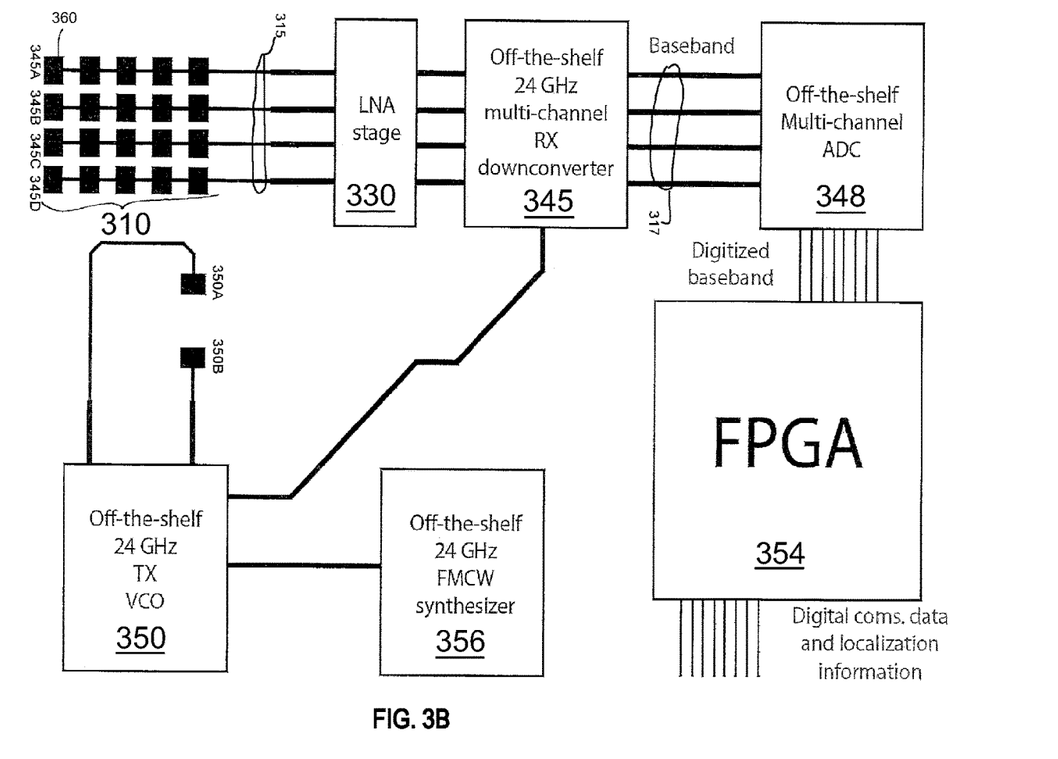
FIG. 3B is a circuit schematic of the reader assembly of FIG. 3A.
Figure 5:
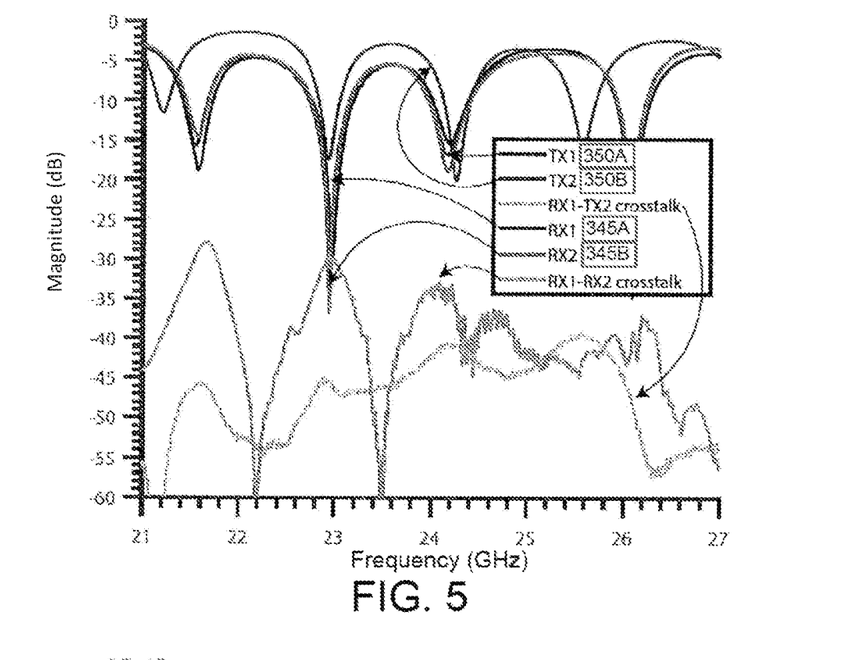
FIG. 5 is a schematic illustration of measured S-parameters of a custom 2 by 4 reader antenna.

The reader 300 used for this effort is based, in one non-limiting example, on a low-cost 24 GHz chipset. The commercially-available EV-RADAR-MMIC2 development board-comprising the ADF4159 PLL, the ADF5901 transmitter 350A, 350B used for standard 24 GHz FMCW application, and a 4-channel ADF5904 receiver 345A, 345B, 345C, 345D was used for detection purposes. The down-converted baseband channels 317 of the receiver 300 were connected to an oscilloscope and the data was saved for processing by a computer having a processor running software stored in memory as shown in FIG. 3A and discussed below. In the reader 300, a custom array 310 comprised of 4 linear antenna arrays 345A, 345B, 345C, 345D for reception and 2 cross-polarized transmitting patch antennas 350A, 350B were designed and fabricated onto a 12-mil-thick Rogers RO4003 substrate. The measured properties of the antenna 310 are shown on FIG. 5, displaying adequate performance for use in the Ku band, or more particularly the 24 GHz to 24.25 GHz ISM frequency band. More importantly, the isolation between RX and TX is measured to be at least 40 dB, thereby demonstrating the benefits of the cross-polarizing approach.

Figure 6:
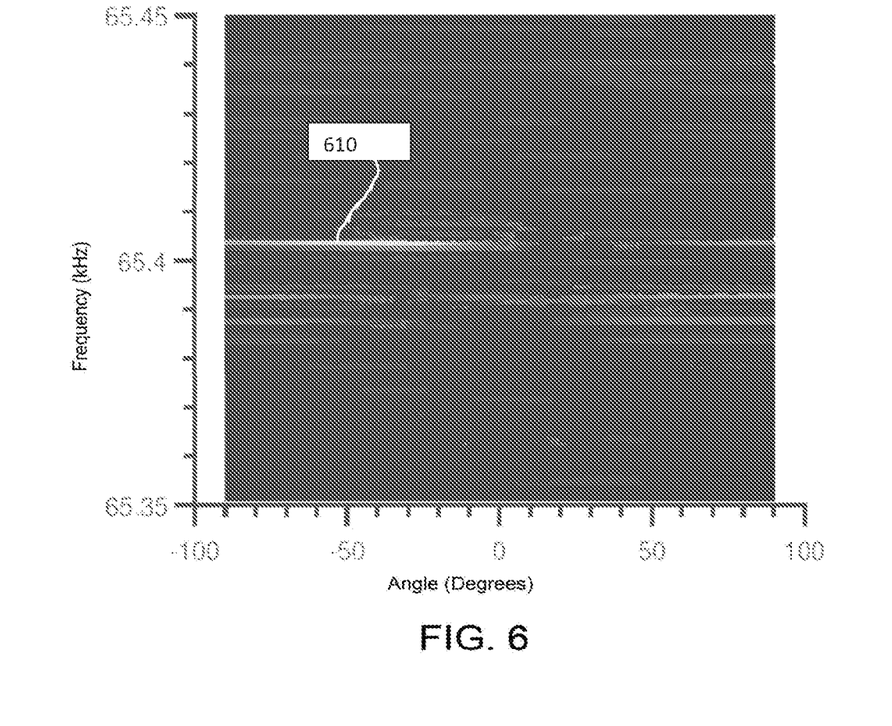
FIG. 6 is a schematic illustration showing the magnitude of the output of a 2D Fast Fourier Transform (FFT) in the case of a backscatter target in the −40° direction.
Figures 7A, 7B:
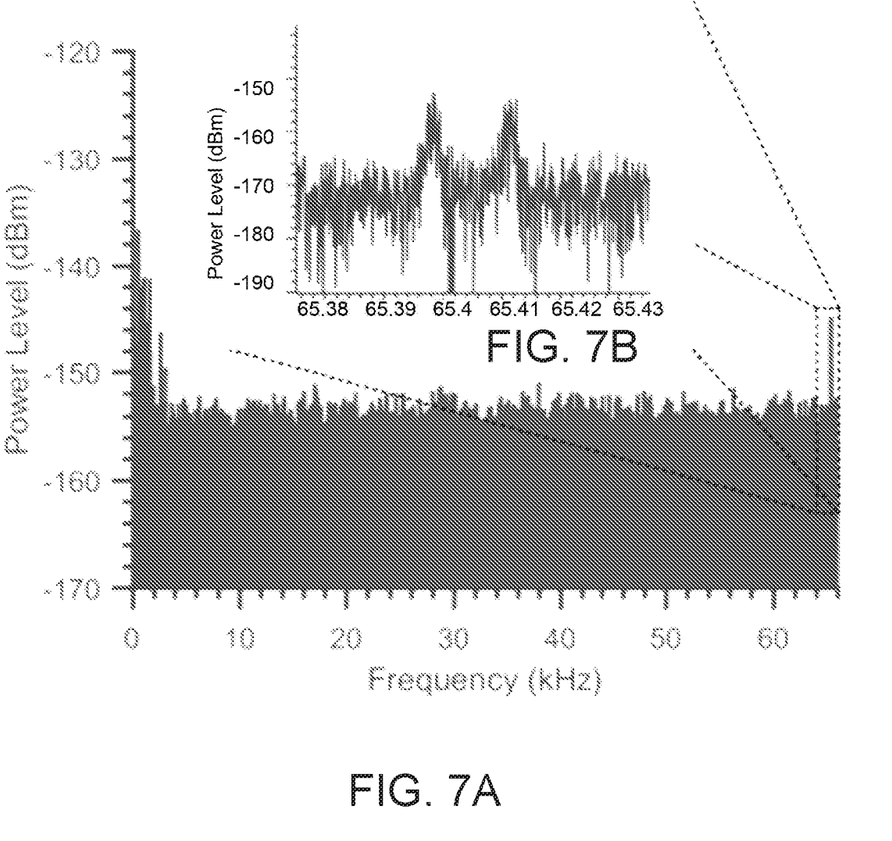
FIG. 7A is a spectrum measured down to the 0° direction for a broad sight backscatter target.
FIG. 7B is an enlarged inset schematic of one portion of the spectrum of FIG. 7A.

In testing one non-limiting embodiment of this disclosure, the baseband down-converted signals 317 of the four channels 315 of the reader 300 were fed to a multi-port oscilloscope and saved for a duration of 1 second at a 200 kHz sampling rate. The data was then imported into Matlab™ and arrayed as a 4 by 200000 matrix before zero-padding (70 additional rows, to reach a total of 74 angular samples) was applied in the small dimension of the matrix. The result of this operation was then processed using a standard 2D Fast Fourier Transform (FFT). In a first measurement, the tag 100, 200 was placed in broad sight of the reader antenna array 310 and its response was processed before the spectrum measured along the zero-degree (0°) direction of incidence was extracted. The result of this operation can be seen in FIGS. 7A and its inset expansion drawing of one peak frequency 700 around 64.45 kHz at FIG. 7B. The figures display the properties expected from the interrogation of a square-signal-modulated backscatter tag device/target 100, 200 interrogated through a frequency modulated continuous wave (FMCW) scheme. The response shown in FIG. 7B is frequency-offset from the typical FMCW response by the modulation frequency of the tag 100, 200 as affected by either a sensor 240 or another modulation circuit 275 other than a sensor, thereby allowing high isolation from the interference from cross-talk and passive targets. In addition, the spectrum displays a double peak 705A, 705B, the peaks having separation that is twice the standard beat frequency associated with the range of the tag—about 4 m in this example test case. In another measurement, with the tag 100, 200 placed at an approximate angle of negative forty degrees (−40°) relative to the reader 300, the plot of the magnitude of the output of the 2D Fast Fourier Transform (FFT) is extracted and the in-phase channel shown in FIG. 6. The data clearly allows for the angular localization of the target/tag given that the spectrum at −40 degrees has a maximum 610 at −40 degrees around 65.45 kHz, which matches the data of FIG. 7.

Figure 8:
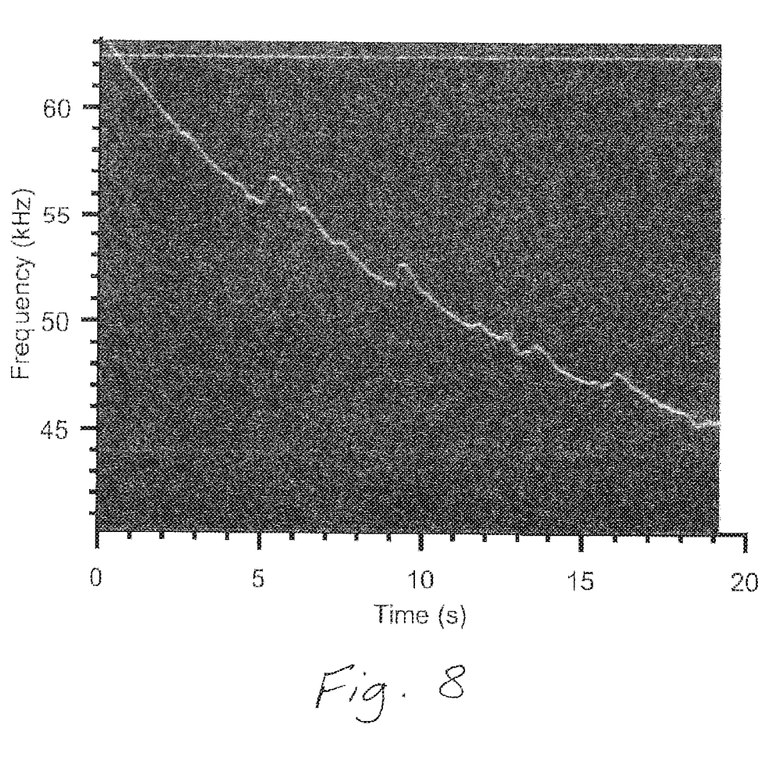
FIG. 8 is a schematic illustration of a wirelessly-measured spectrogram of the modulation frequency of the tag during a DMMP exposure event at the sensor.

In a final experiment, tag 100, 200 incorporating a sensor 240 was exposed to a direct spray of the chemical warfare agent (CWA) DMMP, and the shift of its modulation frequency wirelessly measured. Again, this modulation frequency is determined by an RC circuit when the resistance of the sensor material is variable, changing the resistance value R of the resistor-capacitor RC circuit and its oscillation frequency in the presence of environmental conditions—in this case, DMMP spray. The result of this experiment, shown in FIG. 8, demonstrate the CWA sensing capabilities of the sensor/tag 100, 200. The immediacy of the sensor material resistance change, and the frequency response of FIG. 8 (i.e., reaching the peak 64.45 kHz in a fraction of one second) illustrates the efficacy of the device as the environmental condition (the DMMP) dissipates over time.

The combination of backscatter communications for low-power wireless transmission and of digital beam-forming and FMCW for, respectively, radial and angular localization for spatial multiplexing provides a solution to the technical hurdles currently facing ubiquitous Smart Skin implementations for ubiquitous gas sensing or other applications. The approach enables a multiplexable and sensing-enabled sticker for the "Internet of Skins (IoS)"—flexible thin tags connected over a network and spatially multiplexed for backscatter transmission—hereby opens the door for the emergence of truly-energy-autonomous, ultra-low-profile systems.

Other example embodiments are set forth in the claims of this document. In a first embodiment, a system of detecting backscatter wave emissions from a set of data sources, including but not limited to tag devices 100, 200 includes a computerized reader 300 in communication with a computer processor 114 and memory 116 with the reader 300 including at least one transmitter 350A, 350B and at least one receiver 345A, 345B, 345C, 345D connected to a reader power source (not shown). A plurality of tag devices 100, 200 are configured to communicate with the reader 300 and in one non-limiting example have at least one sensor assembly 240 configured to gather data, such as the environmental conditions discussed in the examples above. Each tag device may have a respective energy harvester and/or energy storage device (a rechargeable battery, an autonomous solar cell, or the like) providing power to each of the tag devices. A timer circuit 177 is connected to the sensor assembly 240 and configured to generate an output 281 having a frequency response corresponding to the sensor assembly. In one example, the sensor 240 is a resistometric device with a resistance that varies in the presence of environmental conditions, so that a resistor-capacitor (RC) circuit will have frequency that changes in the presence of the environmental conditions. Various materials can then be engineered to show a known resistance response in the presence of certain conditions about or within the sensor.

An array 110, 210 of antennas 160, 260 are each connected to the output of the timer circuit 177 or a modulation circuit 275 such that the output 281 of the timer circuit modulates backscatter wave emissions from the array. In service, the tag devices 100, 200 are positioned within an interrogation range of the transmitters and receivers of the reader 300. The individual antennas 160, 260 of the tag devices 100, 200 reflect an incident wave transmission from the transmitter 350A, 350B of the reader 300 back to the receiver 345A-345D of the reader, and the receiver 345A-345D is connected to a computer 390 having at least one processor 114 to identify a frequency shifts relative to the original incident wave transmission from the reader 300. The processor 114 may be connected to memory 116 that implements software therein to identify all aspects of the communications as shown in the figures. The frequency shift of backscatter communications from the tags, relative to an incident wave transmission from the reader, corresponds to the frequency response of the output 281 from the timer circuit 177, which in one embodiment described above detects the resistometric frequency response of a sensor 240. In other words, certain embodiments may allow a sensor 240 to set a resistance based on environmentally sensed conditions, and that resistance is part of an RC circuit that sets the timer frequency. All the while, a reader 300 transmits an incident wave toward the plurality of tags, and the incident wave has an original frequency. The timer frequency at the tag modulates the incident wave at the tag device antenna array 110, 210 in a retrodirective reflectarray operation that sends modulated backscatter emissions back to the reader array 310 for processing and demodulates the backscatter emissions. The sensor 240, therefore, has at least one structure 177, 240, 275 producing an oscillation frequency as part of a circuit connected to the antenna array 110, 210 and the oscillation frequency is detected by the timer 177. In one embodiment, the structure in the sensor 240 has carbon nanotubes with a resistivity setting the oscillation frequency in an RC network. The oscillation frequency set by the structure in the sensor is variable according to environmental conditions (e.g., the sensor may be resistometric and a change in resistance value due to sensed conditions changes the resistance in an RC network), and therefore also changes the oscillation frequency used to modulate backscatter emissions from a tag device 100, 200.

In one embodiment, a system as disclosed herein includes arrays 110, 210, 310 of antennas at both the tag device and at the reader. The array 110, 210 at the tag device reflects an incident wave transmission from the reader 300 back to the receiver(s) 345 in the reader as backscatter wave emissions in a cross-polarized state. The process of cross polarization can be shown in one example in FIG. 1B. In FIG. 1B, the antenna array 110 from a tag device 100 includes columns 180A, 180B, 180C, 180D, 180E, which are essentially single dimension arrays of individual antennas 160. Feed terminals 195A, 195B, 195C, 195D, 195E provide electric signals used to modulate backscatter emissions from the tag devices 100. In one non-limiting embodiment, the feed terminals transmit an output 281 from a timer circuit 177 as described above or any modulation circuit 275, whether connected to a sensor 240 or not. In some embodiments, the tag device 110, 210 may not utilize a sensor 240 (thus shown in dotted lines as optional in FIG. 3) and only utilize digital modulation (i.e., digital symbol modulation at multiple frequencies) to reflect the backscatter emissions back to the reader. As shown in more detail in FIG. 1B, the feeds from feed terminals 195A-195E are applied to respective serial ports ($Xs_y$) and parallel ports ($Xp_y$) at each antenna 160 in each column 180. The circuitry connected to the serial ports and the parallel ports at each antenna includes hardware to adjust the phase of the arriving signals from the respective serial ports ($Xs_y$) and parallel ports ($Xp_y$) for transmission by the antennas 160, 260. In other words, the respective antennas (160) are fed through a parallel (p) network in one polarization and through a serial (s) network in another polarization. The antenna ports are connected in dual pairs (s)-(p) across the array in geometrically corresponding patterns relative to the axis of symmetry of the structure. For example, in FIG. 1B, feed terminal 195A is connected as a serial feed 185A to serial ports ($1s1$, $1s2$, $1s3$, $1s4$, $1s5$) to column array 180A, and that same feed terminal 195A is connected as a parallel feed 187E to parallel ports ($5p1$, $5p2$, $5p3$, $5p4$, $5p5$) to column array 180E which corresponds to column array 180A respective to the axis of symmetry (e.g., column array 180C). Feed terminal 195B is connected as a serial feed 185B to serial ports ($2s1$, $2s2$, $2s3$, $2s4$, $2s5$) to column array 180B, and that same feed terminal 195B is connected as a parallel feed 187D to parallel ports (4p1, 4p2, 4p3, 4p4, 4p5) to column array 180D which corresponds to column array 180B respective to the axis of symmetry (e.g., column array 180C). Feed terminal 195C is connected to column array 180C, which is an axis of symmetry in this example. Feed terminal 195C, therefore, has its serial feed 185C connected to the serial ports (3s1, 3s2, 3s3, 3s4, 3s5) and its parallel feed 187C to the parallel ports of column array 180C (i.e., 3p1, 3p2, 3p3, 3p4, 3p5). In the other direction around the array 110, feed terminal 195D is connected as a serial feed 185D to serial ports (4s1, 4s2, 4s3, 4s4, 4s5) to column array 180D, and that same feed terminal 195D is connected as a parallel feed 187B to parallel ports (2p1, 2p2, 2p3, 2p4, 2p5) to column array 180B which corresponds to column array 180D respective to the axis of symmetry (e.g., respective to column array 180C). Feed terminal 195E is connected as a serial feed 185E to serial ports (5s1, 5s2, 5s3, 5s4, 5s5) to column array 180E, and that same feed terminal 195E is connected as a parallel feed 187A to parallel ports (1p1, 1p2, 1p3, 1p4, 1p5) to column array 180A which corresponds to column array 180E respective to the axis of symmetry (e.g., column array 180C).

By using the cross-polarization structure of FIG. 1B, the backscatter wave emissions from the tag devices 100, 200 is re-emitted at maximum gain in the direction of the reader 300, in a retrodirective manner The reader may be a frequency modulated continuous wave transmission device that has corresponding antennas 360 receiving backscatter wave emission from each antenna in the array 110, 210 of the tag devices 100, 200 in a multiple input-multiple-output (MIMO) scheme to determine an angle of arrival of the backscatter wave emissions. The cross-polarization technique of FIG. 1B could be used in the reader array as circumstances dictate.

Figure 2:
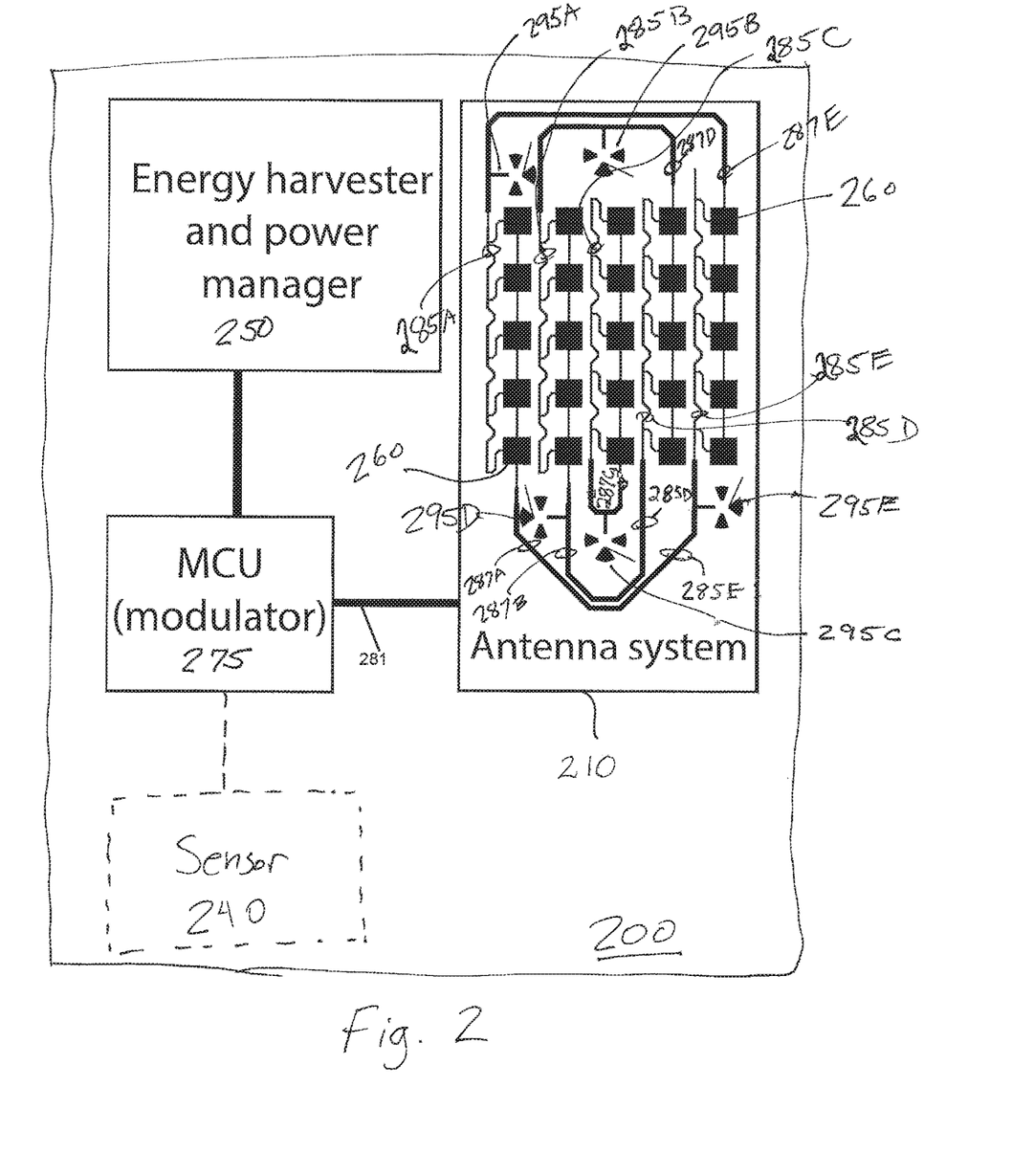
FIG. 2 is a schematic illustration of a tag device having a retrodirective antenna array as disclosed herein.

In a different embodiment, a tag device 100, 200 for use in a backscatter wave emission reading system includes a power circuit 250, at least one sensor assembly 240 (shown as an optional feature by dotted lines) configured to gather data from an environment, and a timer circuit 177, 275 connected to the sensor assembly 240 and configured to generate an output 281 having a frequency response corresponding to the sensor assembly 240. An array 110, 210 of antennas is positioned to reflect an incident wave transmission having a resonant frequency in the Ku band (i.e., at least 24 GHz), wherein each antenna is connected to the output 281 of the timer circuit (or modulation circuit 275) such that the output of the timer circuit modulates backscatter wave emissions from the array of antennas. In FIG. 2, the timer circuit may be part of an overall modulator 275 with or without a sensor 240 as described above. The sensor assembly, the timer circuit, and the array of antennas are connected to the power circuit.

Another embodiment disclosed below includes a computerized method of retrieving backscatter emissions from a plurality of tag devices 100, 200 by positioning the plurality of tag devices within an interrogation range of a reader 300, the tag devices each having multiple reflecting antennas 160. Measuring an oscillation frequency of a sensor 240 in at least one selected tag device establishes a first oscillation frequency measurement such that upon receiving an incident wave transmission at the selected tag device, the frequency modulates the incident wave transmission with the oscillation frequency of the sensor (or set in part by the sensor) to form a backscatter wave transmission from the selected tag device. A reader 300 receives communications from the tag by reflecting the backscatter wave transmission at a modulated frequency from each of the antennas in the selected tag device, wherein the reflecting includes cross-polarizing the backscatter wave transmission relative to the incident wave transmission. Receiving backscatter wave transmission from each of the antennas at a respectively modulated frequency in a plurality of corresponding antennas in a reader device allows for demodulation by a computer to extract data communications from the backscatter emissions. In the computerized method, steps include receiving, continuously and simultaneously at the reader device, distinct backscatter wave transmissions from the plurality of tag devices; and calculating, on a continuous basis, an angle of arrival for the backscatter wave transmissions by monitoring the corresponding antennas of the reader device with a computer. The computerized method further includes calculating a range of an origin for the backscatter wave transmissions (typically but not exclusively a transmitter from a corresponding reader device). Next, by identifying a location of the origin with the angle of arrival and the range of the origin, the method accommodates identifying an originating tag for backscatter wave transmissions received during a time period at the corresponding reader. The received backscatter wave transmissions are from a plurality of tags are multiplexed (i.e, frequency and/or spatially multiplexed per antenna and per tag device) as the backscatter transmissions arrive at a given reader. The multiplexing accommodates identifying the identification of the originating tags, transmitting multiplexed backscatter wave transmissions for the plurality of tags to the computer, and using the computer to pair respective backscatter wave transmissions with originating tags at respective origins to create a spatially multiplexed data set of backscatter wave data. In one embodiment, the incident wave transmission from the reader device is at a resonant frequency of at least 24 GHz. A computerized method may further be used for identifying the difference in a resonant frequency of the incident wave transmission and the modulated frequency of the backscatter wave transmission and utilizing the difference to isolate environmental data from respective sensors in respective tags.

In yet another embodiment, a system of detecting backscatter wave emissions from a set of data sources 100, 200 includes a computerized reader 300 in communication with a computer processor 114 and memory 116, and the reader 300 has at least one transmitter 350A, 350B and at least one receiver antenna 345. A plurality of tag devices is part of the system, and each tag device has a power circuit, preferably but not exclusively with an energy harvesting and storing device 250. A modulation circuit 275 is connected to the sensor assembly 240 (if present) and configured to generate an output 281 having a frequency response that is unique for each respective one of the tag devices. An array of antennas includes each antenna connected to the output 281 of the modulation circuit such that the output of the modulation circuit controls frequency modulation of backscatter wave emissions from the array. The array of antennas reflects an incident wave transmission from the reader back to the receiver as the backscatter wave emissions in a cross-polarized state. The backscatter wave emissions from the tag devices are re-emitted at maximum gain in the direction of the reader, in a retrodirective manner after the reader has transmitted the incident wave transmission from the reader device at a resonant frequency of at least 24 GHz. In certain non-limiting embodiments, the reader is a frequency modulated continuous wave transmission device. Accordingly, the reader may include corresponding antennas receiving backscatter wave emissions from each antenna in the array in a multiple input-multiple-output (MIMO) scheme to determine an angle of arrival of the backscatter wave emissions.

The reader 300 is equipped to transmit the incident waves toward the tag devices using the synthesizer 356 connected to the transmitters 350A, 350B. The antenna array is likewise equipped to receive reflected modulated backscatter radiation from the tags, with each incoming reflection being frequency modulated by the tag hardware 177, 240, 275 and spatially multiplexed by the positions of each individual tag antenna 160 transmitting at a particular angle and distance to a corresponding antenna 360 at the reader (300). The reader may include all necessary hardware such as low noise amplifiers 330, downconverters 345, analog to digital converters 348 and field programmable arrays 354 for data processing purposes and the synthesizer 356 for transmission operations related to directing incident waves to the tag devices.

In example implementations, at least some portions of the activities may be implemented in software provisioned on various computer and networking devices. Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device may be applicable in other exchanges or routing protocols. Moreover, although network device has been illustrated with reference to particular elements and operations that facilitate the communication process, these elements, and operations may be replaced by any suitable architecture or process that achieves the intended functionality of network device.

In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the computer and network components of the figures (e.g., network devices) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory 116) can store data used for the operations described herein. This includes the memory being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 114) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element ' Similarly, any of the potential processing elements, modules, and machines described in this Specification should be construed as being encompassed within the broad term 'processor.'

The list of network destinations can be mapped to physical network ports, virtual ports, or logical ports of the router, switches, or other network devices and, thus, the different sequences can be traversed from these physical network ports, virtual ports, or logical ports. Note also that an 'application' as used herein this Specification, can be inclusive of an executable file comprising instructions that can be understood and processed on a computer, and may further include library modules loaded during execution, object files, system files, hardware logic, software logic, or any other executable modules.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

REFERENCES

1. J. G. D. Hester and M. M. Tentzeris, "Inkjet-printed flexible mm-wave Van-Atta reflectarrays: A solution for ultra-long-range dense multi-tag and multi-sensing chipless RFID implementations for IoT Smart Skins," IEEE Trans. Microw. Theory Tech., vol. 57, no. 5, pp. 1303-1309, May 2017.

2. J. G. Hester and M. M. Tentzeris, "A mm-wave ultra-long-range energy-autonomous printed RID-enabled Van-Atta wireless sensor: At the cross-roads of 5 g and IoT," in Microwave Symposium (IMS), 2017 IEEE MTT-S International. IEEE, 2017, pp. 1557-1560.

3. A. Strobel, C. Carlowitz, R. Wolf, F. Ellinger, and M. Vossiek, "A millimeter-wave low-power active backscatter tag for FMCW radar systems," IEEE Transactions on Microwave Theory and Techniques, vol. 61, no. 5, pp. 1964-1972, 2013.

4. K. Wang, J.-F. Gu, F. Ren, and K. Wu, "A multitarget active backscattering 2-d positioning system with super resolution time series post-processing technique," IEEE Transactions on Microwave Theory and Techniques, vol. 65, no. 5, pp. 1751-1766, 2017.

The invention claimed is:

1. A system of detecting backscatter wave emissions, the system comprising:
    a computerized reader in communication with a computer processor and memory, the reader comprising a transmitter and a receiver; and
    a tag device comprising:
        a timer circuit receiving data and generating an output having a frequency response corresponding to the data; and
        an array of antennas each connected to the output of the timer circuit such that the output of the timer circuit modulates backscatter wave emissions from the array, wherein the array of antennas comprises a first port to receive the backscatter wave emissions, a second port to receive the output of the timer circuit to modulate the backscatter wave emissions, and a third port to transmit the modulated backscatter wave emissions.

2. A system according to claim 1, wherein the timer circuit frequency modulates backscatter wave emissions from the array.

3. A system according to claim 1, wherein the tag device is positioned within an interrogation range of the transmitter of the reader.

4. A system according to claim 1, wherein the antennas reflect an incident wave transmission from the transmitter back to the receiver, and wherein the receiver is connected to the computer processor to identify a frequency shift relative to the incident wave transmission.

5. A system according to claim 4, wherein the frequency shift corresponds to the frequency response of the output from the timer circuit.

6. A system according to claim 1, further comprising an energy harvester providing power to the tag device.

7. A system according to claim 1, wherein the array of antennas reflects an incident wave transmission from the reader back to the receiver as the backscatter wave emissions in a cross-polarized state.

8. A system according to claim 1, wherein the backscatter wave emissions from the tag device is re-emitted at maximum gain in a direction of the reader, in a retrodirective manner.

9. A system according to claim 1, wherein the reader is a frequency modulated continuous wave transmission device.

10. A system according to claim 1, wherein the reader comprises corresponding antennas receiving backscatter wave emission from each antenna in the array in a multiple input-multiple-output (MIMO) scheme to determine an angle of arrival of the backscatter wave emissions.

11. A tag device for use in a backscatter wave emission reading system, the tag device comprising:
    a power circuit;
    a timer circuit receiving data and generating an output having a frequency response corresponding to the data; and
    an array of antennas positioned to reflect an incident wave transmission having a resonant frequency in the Ku band, wherein each antenna is connected to the output of the timer circuit such that the output of the timer circuit modulates backscatter wave emissions from the array of antennas, wherein the array of antennas comprises a first port to receive the backscatter wave emissions, a second port to receive the output of the timer circuit to modulate the backscatter wave emissions, and a third port to transmit the modulated backscatter wave emissions,
    wherein the timer circuit and the array of antennas are in electrical communication with the power circuit.

12. A computerized method of retrieving backscatter emissions comprising:
    positioning a plurality of tag devices within an interrogation range of a reader, the tag devices each having multiple reflecting antennas;
    receiving an incident wave transmission at the selected tag device;
    frequency modulating the incident wave transmission with an oscillation frequency to form a backscatter wave transmission from the selected tag device;
    reflecting the backscatter wave transmission at a modulated frequency from each of the antennas in the selected tag device, wherein the reflecting comprises cross-polarizing the backscatter wave transmission relative to the incident wave transmission, wherein each of the antennas comprise a first port to receive the incident wave transmission, a second port to receive the output of the timer circuit to frequency modulate the incident wave transmission, and a third port to transmit the backscatter wave transmission; and
    receiving the backscatter wave transmission from each of the antennas at a respectively modulated frequency in a plurality of corresponding antennas in a reader device.

13. A computerized method according to claim 12, further comprising:
    receiving, continuously and simultaneously at the reader device, distinct backscatter wave transmissions from the plurality of tag devices; and
    calculating, on a continuous basis, an angle of arrival for the backscatter wave transmissions by monitoring the corresponding antennas of the reader device with a computer.

14. A computerized method according to claim 13, further comprising:
    calculating a range of an origin for the backscatter wave transmissions;
    identifying a location of the origin with the angle of arrival and the range of the origin;
    identifying originating tags for backscatter wave transmissions received during a time period;
    multiplexing the received backscatter wave transmissions according to identification of the originating tags;
    transmitting multiplexed backscatter wave transmissions for the plurality of tags to the computer; and
    using the computer to pair respective backscatter wave transmissions with originating tags at respective origins to create a spatially multiplexed data set of backscatter wave data.

15. A computerized method according to claim 12 further comprising transmitting the incident wave transmission from the reader device at a resonant frequency of at least 24 GHz.

16. A computerized method according to claim 12, further comprising identifying a difference in a resonant frequency of the incident wave transmission and the modulated frequency of the backscatter wave transmission.

17. A system of detecting backscatter wave emissions, the system comprising:
a computerized reader in electrical communication with a computer processor and memory, the reader comprising a transmitter and a receiver;
a tag device comprising:
  a power circuit comprising an energy harvesting and storing device;
  a modulation circuit generating an output having a frequency response that is unique for the tag device;
  an array of antennas each in electrical communication with the output of the modulation circuit such that the output of the modulation circuit controls frequency modulation of backscatter wave emissions from the array,
  wherein the array of antennas reflects an incident wave transmission from the reader back to the receiver as the backscatter wave emissions in a cross-polarized state, wherein the array of antennas comprises a first port to receive the incident wave transmission, a second port to receive the output of the timer circuit to frequency modulate the incident wave transmission to form the backscatter wave emissions, and a third port to transmit the backscatter wave emissions.

18. A system according to claim 17, wherein the backscatter wave emissions from the tag device is re-emitted at maximum gain in a direction of the reader, in a retrodirective manner.

19. A system according to claim 18 further comprising transmitting the incident wave transmission from the reader at a resonant frequency of at least 24 GHz.

20. A system according to claim 18, wherein the reader is a frequency modulated continuous wave transmission device.

21. A system according to claim 18, wherein the reader comprises corresponding antennas receiving backscatter wave emission from each antenna in the array in a multiple input-multiple-output (MIMO) scheme to determine an angle of arrival of the backscatter wave emissions.

22. The system of claim 1, further comprising a sensor assembly in electrical communication with the timer circuit and gathering the data, wherein the frequency response corresponds to the data gathered by the sensor assembly.

23. The method of claim 12, wherein the oscillation frequency is an oscillation frequency of a sensor device, the method further comprising:
measuring the oscillation frequency of a sensor in a selected tag device.

* * * * *